Figure 1:
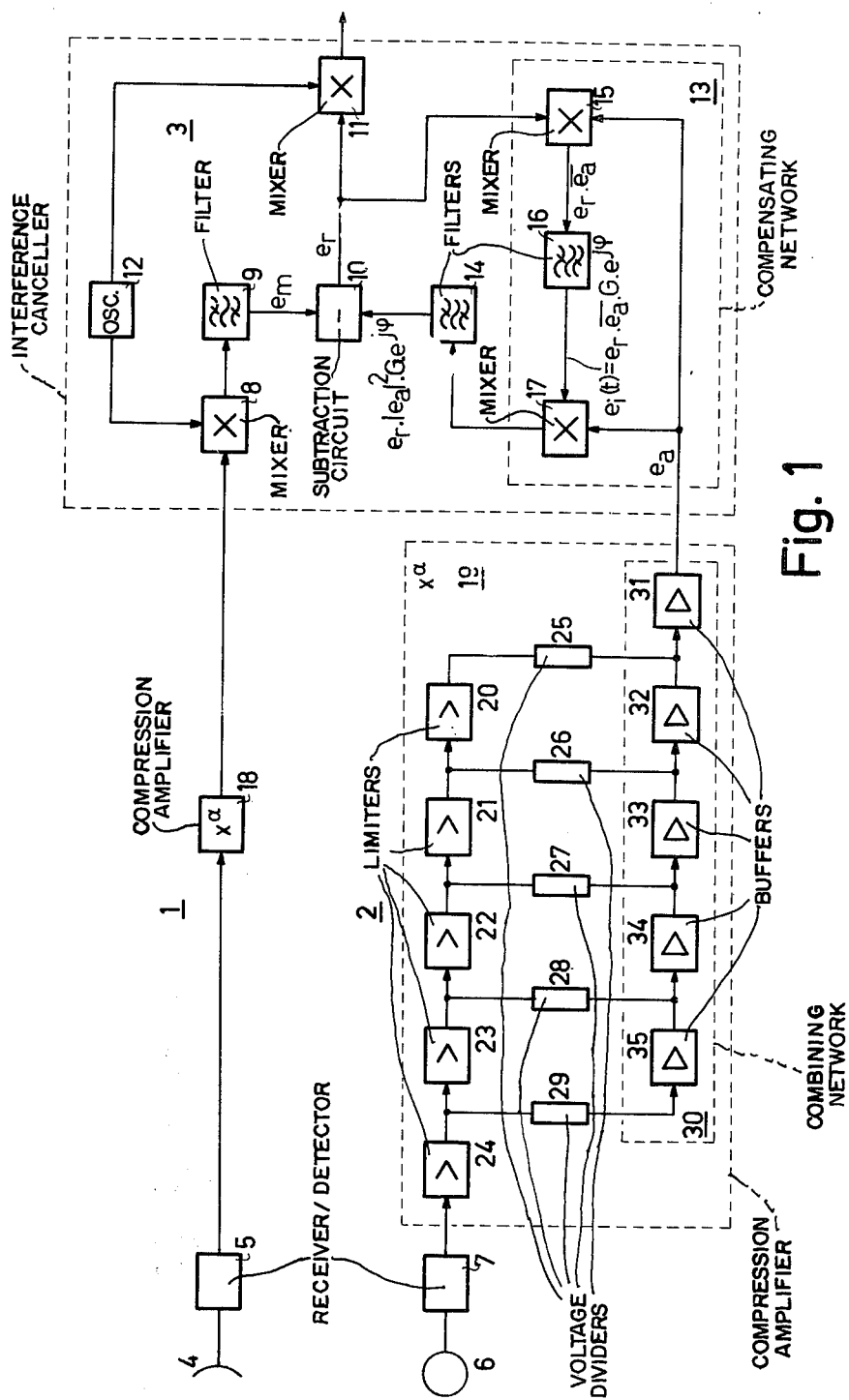

United States Patent [19]

Zwarts et al.

[11] 4,119,963
[45] Oct. 10, 1978

[54] COHERENT SIDE-LOBE SUPPRESSING UNIT FOR A PULSE RADAR APPARATUS

[75] Inventors: Johan Martin Carol Zwarts, Borne; Geert Koops, Haaksbergen, both of Netherlands

[73] Assignee: Hollandse Signaalapparaten B.V., Hengelo (O), Netherlands

[21] Appl. No.: 782,930

[22] Filed: Mar. 30, 1977

[30] Foreign Application Priority Data

Apr. 6, 1976 [NL] Netherlands .......................... 7603559

[51] Int. Cl.² .............................................. G01S 9/233
[52] U.S. Cl. ........................ 343/17.2 PC; 343/100 LE
[58] Field of Search ................... 343/17.2 PC, 100 LE

[56] References Cited

U.S. PATENT DOCUMENTS

| 3,202,990 | 8/1965 | Howells ........................ 343/100 LE |
| 4,021,805 | 5/1977 | Effinger et al. .............. 343/17.2 PC |

FOREIGN PATENT DOCUMENTS 720,345 12/1954 United Kingdom .............. 343/100 LE Primary Examiner—Malcolm F. Hubler
Attorney, Agent, or Firm—Frank R. Trifari; Algy Tamoshunas

[57] ABSTRACT

In a pulse radar apparatus the receiver is provided with a coherent side-lobe suppressing unit comprising:

a. a first and a second transmission channel respectively for directional and omnidirectional reception of r.f. signals, each of said channels having a compression amplifier with the amplitude transfer characteristic $y(t) = \{x(t)\}^\alpha$, where $0 < \alpha < 1$.

b. a subtraction circuit and a phase and amplitude compensating network fed by the subtraction circuit and the second transmission channel to produce signals for the subtraction circuit, the latter signals being equal in phase and amplitude to the signals derived from the first transmission channel and applied to the subtraction circuit.

4 Claims, 2 Drawing Figures

COHERENT SIDE-LOBE SUPPRESSING UNIT FOR A PULSE RADAR APPARATUS

The invention relates to a pulse radar apparatus, provided with a transmitter and receiver which is utilized for the suppression of noise and/or continuous-wave interference signals during the reception of target returns. The receiver comprises:
  a. a first transmission channel responsive to the directional reception and intermediate-frequency detection of signals composed of target returns and of noise and/or continuous-wave interference signals;
  b. a second transmission channel responsive to the omnidirectional reception and intermediate-frequency detection of signals composed of target returns and of noise and/or continuous-wave interference signals;
  c. an interference canceller connected to the two transmission channels for the supply of target returns, which canceller contains a subtraction circuit and a phase and amplitude compensating network generating - after the supply of output signals from the subtraction circuit and from the second transmission channel - output signals for the subtraction circuit, which output signals are equal in phase and amplitude to the signals derived from the first transmission channel and applied to the subtraction circuit, in so far the output signals of the first transmission channel are weaker than those of the second transmission channel.

A pulse radar apparatus with a single transmission channel having a directional antenna system for the reception and intermediate-frequency detection of target returns appears to be very sensitive to the reception of noise and/or continuous wave interference signals, since these signals reach the transmission channel due to the high side-lobe level of the antenna system, together with the target returns obtained through the main-lobe of the radiation pattern of the antenna system. At the radar location these interference signals represent a large average power, which is inversely proportional to the square of the distance between the pulse radar apparatus in question and the interference source. On the other hand, target returns at the radar location represent only a small average power, which is inversely proportional to the fourth power of the distance between the radar and the target.

It is therefore advantageous to provide a pulse radar apparatus with means, as set forth in the opening paragraph, for the suppression of noise and/or continuous wave interference signals during the reception of target returns. This results in an improvement in the subjamming visibility, i.e. the extent to which target echoes, having a strength less than that of the jamming signals, are discernible by the pulse radar apparatus.

Two embodiments of such a pulse radar apparatus are described in the U.S. Pat. No. 3,202,990. In the first embodiment, the omnidirectional antenna system, the appurtenant transmission channel and the phase and amplitude compensating network in the interference canceller are of a single version. Consequently, this embodiment is suitable only for the suppression of the above-mentioned interference signals from a single source. In the second embodiment, the omnidirectional antenna system, the appurtenant transmission channel and the phase and amplitude compensating network are of a multiple design, making this radar suitable for simultaneous suppression of interference signals from a plurality of interference sources. However, the two embodiments of such a pulse radar apparatus are suitable only for the suppression of interference signals of relatively small power. For interference signals of relatively large power, the radar described in the patent does not offer a satisfactory solution since under such conditions the interference canceller is apt to start oscillating.

A solution to this problem is possible if, for a given dynamic input range D, the dynamic output range of each transmission channel were reduced to a fraction $\alpha D$, where $0 < \alpha < 1$. Such a reduction in the dynamic range is possible with the aid of compression techniques. It is therefore obvious to a person skilled in the art to utilize logarithmic compression amplifiers to achieve this end. The application of such compression amplifiers in the two channels implies that, with the supply of interference signals $x(t)$ to the first transmission channel, the resultant output signals are in the form of $\log\{1 + A(t) \cdot x(t)\}$, where $A(t)$ is the relative gain factor between the two channels, while the supply of interference signals $x(t)$ to the input of the second transmission channel produces an output signal of the form $\log\{1 + x(t)\}$. In order to obtain input signals equal both in phase and in amplitude for the above-mentioned subtraction circuit, the difference between the signals $\log\{1 + x(t)\}$ and $\log\{1 + A(t) \cdot x(t)\}$ have to be cancelled, as will be explained below. The output signal of the subtraction circuit may be represented by:

$$\log\{1 + A(t) \cdot x(t)\} - e_i(t) \log\{1 + x(t)\} = \log\left[\frac{1 + A(t) \cdot x(t)}{\{1 + x(t)\}^{e_i(t)}}\right]$$

where $e_i(t)$ is the output signal of the narrow-band crystal filter of the phase and amplitude compensating network. The output signal of the subtraction circuit cannot be kept negligibly small, since the term $e_i(t)$ is unable to follow the variations of $x(t)$ due to the large time constant of the crystal filter. Hence, logarithmic compression techniques are not applicable. Accordingly, it is an object of the present invention to provide a pulse radar apparatus as described in the opening paragraph, where the factor $A(t)$ can be offset.

According to the invention, each transmission channel comprises a compression amplifier which approximates the amplitude transfer characteristic $y(t) = \{x(t)\}^\alpha$, where $0 < \alpha < 1$, $x(t)$ represents the amplifier input signal obtained by i.f. detection in the respective transmission channel and $y(t)$ the output signal of the respective transmission channel. In the design of the receiver, the value of the exponent $\alpha$ i.e. the compression factor, should be selected so as to prevent oscillation of the interference canceller.

Figure 2:
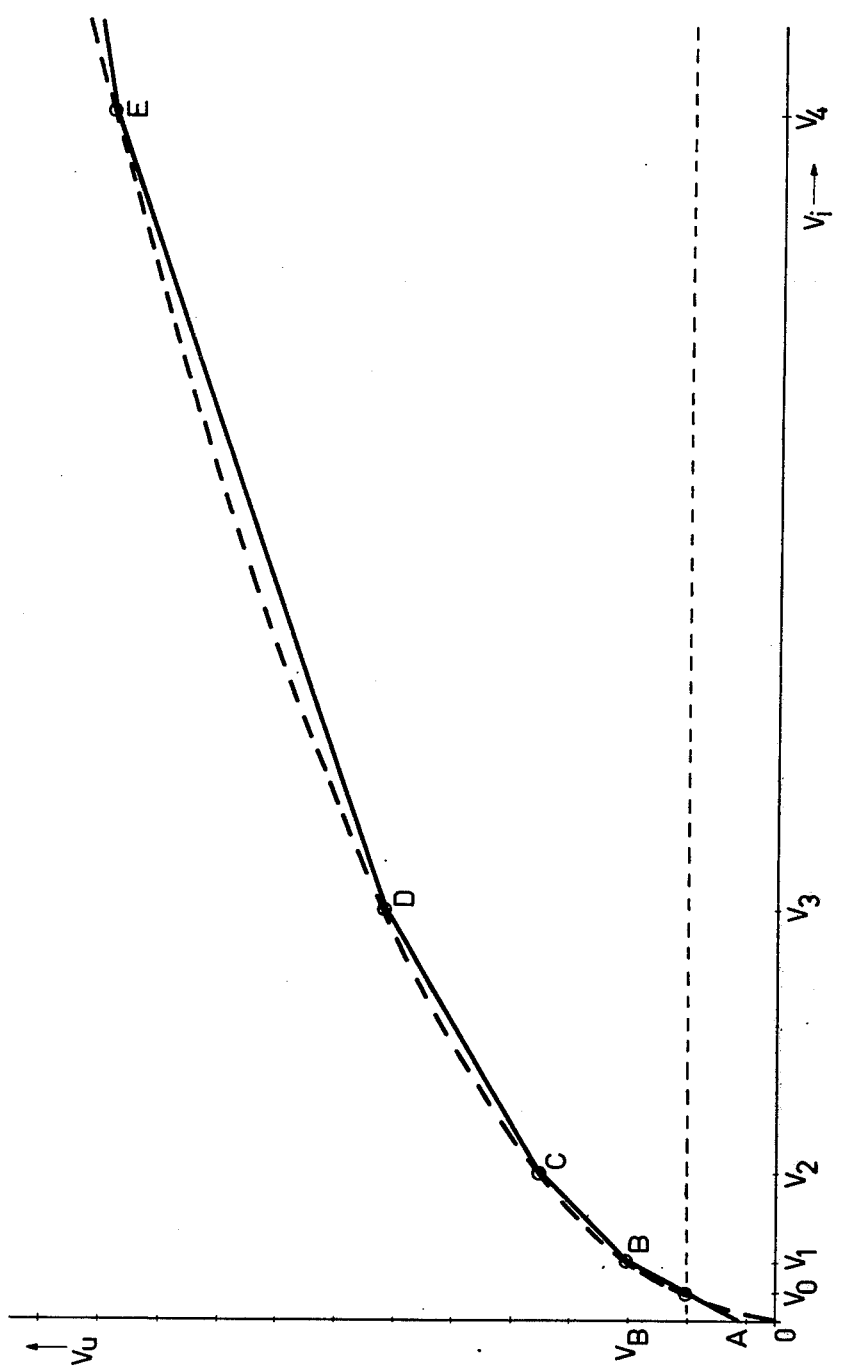

The invention will now be explained with reference to the accompanying drawings in which:

FIG. 1 illustrates an embodiment of a receiver of a pulse radar apparatus according to the invention; and FIG. 2 shows an amplitude transfer characteristic of an embodiment of a compression amplifier for the receiver of FIG. 1.

The receiver shown in FIG. 1 comprises a first and a second signal transmission channel 1 and 2, respectively, which are connected to an interference canceller 3. The first transmission channel 1 is provided with a directional antenna 4 and a receiver/detector 5, in which the signals received by the antenna 4 are intermediate-frequency detected and passed through a coarse filter. The r.f. signals are composed of target returns, noise signals and continuous wave interference signals. The target returns are received principally through the main-lobe of the radiation pattern of the directional antenna 4, and the interference signals through the side-lobe of the antenna. Of concern here are the interference signals from a source location different from that of the desired target. To be able to detect a target return as clearly as possible, it is desirable to suppress, as much as possible, the r.f. signal portion corresponding to the interference signals. To this end the receiver is provided with a second transmission channel 2 and an interference canceller 3. The second transmission channel 2 includes an omnidirectional antenna 6 and a receiver/detector 7. The interference canceller comprises a first mixer 8, a bandpass filter 9, a subtraction circuit 10, a second mixer 11, an oscillator 12, a phase and amplitude compensating network 13 and a second bandpass filter 14. The phase and amplitude compensating network 13 in turn successively includes a mixer 15, a narrow-band crystal filter 16 and a mixer 17. The first mixer 8 receives the output signal from the first transmission channel 1 and the signal from the oscillator 12, which is set at a fixed frequency. The filter 9 passes only that component of the mixer-supplied output voltage which contains the sum of the frequencies of the input signals of mixer 8. This component is applied to subtraction circuit 10. The phase and amplitude compensating network 13 receives the output signal of the second transmission channel 2 and provides an output signal destined for the subtraction circuit 10. The output signal provided by network 13 should be equal in phase and amplitude to the input signal of the subtraction circuit 10 supplied via filter 9, if the latter input signal is to be eliminated. This however requires that the gain factor of the directional antenna 4 corresponding to the side-lobe level of the radiation pattern is not greater than the gain factor of the omnidirectional antenna 6. Moreover, the two transmission channels 1 and 2 should be identical as far as practicable to avoid the introduction of undesired differences in delay of the signals applied to the subtraction circuit 10. This is fundamental for obtaining maximum elimination of the interfering components in the input signal applied via filter 9 to the subtraction circuit 10. In the explanation thereof the input signal applied via transmission channel 1 to the subtraction circuit 10 is indicated by $e_m$, the input signal applied via transmission channel 2 to the phase and amplitude compensating network 13 by $e_a$, and the output signal of the subtraction circuit 10 by $e_r$. Mixer 15 receives both the output signal $e_r$ of the subtraction circuit 10 and signal $e_a$ from the transmission channel 2, and supplies the mixing signal produced therefrom to the narrow-band crystal filter 16 whose central frequency equals the fixed frequency of oscillator 12. After integration in the narrow-band filter 16 with a gain factor G and a phase shift $\phi$, the following relatively noise-free unmodulated signal is produced:

$$e_i = G \cdot e_r \cdot \overline{e_a} \cdot e^{j\phi},$$

where the gain factor G and the phase shift are frequencydependent, the phase shift in the embodiment in question being less than $\pi/2$ and equal to 0 for the central frequency of the filter. On the application of both signals $e_i$ and $e_a$, the mixer 17 supplies the subtraction circuit 10 with the following product signal via filter 14:

$$e_a \cdot e_i = G \cdot e_r \cdot |e_a|^2 \cdot e^{j\phi}.$$

The subtraction circuit 10 also receives the input signal $e_m$ via filter 9 and produces the following output signal $e_r$:

$$e_r = e_m - G \cdot e_r \cdot |e_a|^2 \cdot e^{j\phi} \text{ or } e_r = \frac{e_m}{1 + G \cdot |e_a|^2 \cdot e^{j\phi}}.$$

From the amplitude ratio:

$$\left| \frac{e_r}{e_m} \right| = \frac{1}{1 + G^2 \cdot |e_a|^4 + 2G \cdot |e_a|^2 \cdot \cos\phi}$$

and a large gain factor G ($G \approx 10^5$ in the embodiment in question), it is seen that the residue signal $e_r$ has been practically eliminated.

It should however be noted that the amplitude of the output signal of the narrow-band filter 9 is derived from the average interference energy reaching transmission channels 1 and 2 and that return pulses, having a short pulse length in comparison with the large time constant of the narrow-band filter, are passed relatively well.

However, a pulse radar apparatus as described above does not offer a satisfactory solution to the receipt of interference signals of relatively large power, since the interference canceller will start oscillating on the receipt of such interference signals.

A solution to this problem is obtained by reducing the dynamic output range of transmission channels 1 and 2 in comparison with the dynamic input range. For this purpose, transmission channels 1 and 2 are provided with compression amplifiers 18 and 19 respectively. As known from Skolnik's "Introduction to Radar Systems," edition 1962, page 432, logarithmic amplifiers are considered very suitable to prevent overloading of an i.f. amplifier and to reduce clutter signals. Tests on logarithmic amplifiers, utilized as compression amplifiers 18 and 19, proved, however, that the oscillation phenomenon did not appear but the interference signals had hardly been attenuated and were hence delivered by the interference canceller 3. This phenomenon may be explained as follows:

The narrow-band crystal filter 16 produces a correction $e_i(t)$ in such a way that mixer 17 is enabled to transform the applied signal $e_a$ into a signal whose phase and amplitude are equal to that of the input signal $e_m$ of the subtraction circuit 10. If $A(t) \cdot x(t)$ represents the signal detected by receiver/detector 5 and $x(t)$ the signal detected by receiver/detector 7, where $A(t)$ is the relative gain factor between channels 1 and 2, and utilizing a logarithmic amplifier as compression amplifiers 18 and 19, the input signal $e_m$ takes the form: $\log\{1 + A(t) \cdot x(t)\}$ and the input signal $e_a$ of the phase and amplitude compensating network 13: $\log\{1 + x(t)\}$. Introducing the correction $e_i(t)$, the mixer 17 produces the second input signal of the subtraction circuit 10 as follows: $e_i(t) \cdot \log\{1 + x(t)\}$. The output signal $e_r$ will thus be:

$$e_r = \log\{1 + A(t) \cdot x(t)\} - e_i(t) \cdot \log\{1 + x(t)\} =$$

$$\log\left[ \frac{1 + A(t) \cdot x(t)}{\{1 + x(t)\}^{e_i(t)}} \right]$$

The above expression for signal $e_r$ should equal 0 as near as possible, irrespective of the rate at which the fluctuations occur in the input signal $x(t)$; $e_i(t)$ would hve to be a very rapidly varying function to be able to match itself to the variations in the signal $x(t)$ in all circumstances. However, this is not possible due to the large time constant of the narrow-band crystal filter 16.

It was found that a compression amplifier having an amplitude transfer characteristic $y(t) = \{x(t)\}^\alpha$ where $0<\alpha<1$, (such an amplifier being hitherto unknown in the radar technique), provided good results. This can be explained as follows: The signals $e_m = \{A(t)\}^\alpha \cdot \{x(t)\}^\alpha$ and $e_a = \{x(t)\}^\alpha$ are obtained with the aid of the latter amplifier. Using the correction $e_i(t)$ of the crystal filter 16 the signals $\{A(t)\}^\alpha \cdot \{x(t)\}^\alpha$ and $e_i(t) \cdot \{x(t)\}^\alpha$ are applied to the subtraction circuit 10, producing the output signal $e_r$: $[\{A(t)\}^\alpha - e_i(t)] \cdot \{(x(t)\}^\alpha$. The relative gain factor $A(t)$ between channels 1 and 2, in so far as the return signals received by the directional antenna 5 are obtained in accordance with the sidelobe reception pattern, will hardly be affected by variations, thus permitting adjustment of the correction $e_i(t)$ to $A(t)$. Hence the term $\{A(t)\}^\alpha - e_i(t)$ kan be kept sufficiently small, so that $e_r \approx 0$, irrespective of the variations in $x(t)$.

On the receipt of return signals by the directional antenna 4 in accordance with the main lobe reception pattern, the relative gain factor $A(t)$ is changed stepwise to $A(t)$. Since the narrow-band crystal filter 16 permits the adjustment of $e_i(t)$ to $A(t)$ only at a slow rate, the term $\{A(t)\}^\alpha - e_i(t)$ will not assume a small value during the processing of a return signal obtained in accordance with the main-lobe reception pattern; hence the residue term $e_r$ will be of considerable proportions and the target return will not be suppressed.

The operation of a compression amplifier, having an amplitude transfer characteristic $y(t) = \{x(t)\}^\alpha$ where $0<\alpha<1$, will be further described with reference to FIGS. 1 and 2. The construction of a compression amplifier approximating the given characteristic, is shown schematically by amplifier 19. The amplifier comprises a number of linear, series-connected limiters 20–24. The output signal of each the limiters 20–24 is fed to a combination network 30, which includes a number of buffers 31–35, via a voltage divider 25, 26, . . . , 29 respectively. With a small input voltage, all limiters 20–24 operate linearly, and combination network 30 delivers a linear output voltage, as shown in FIG. 2 by the line AB. When the input voltage to the amplifier 19 rises to a certain value $v_1$, the last limiter 20 is driven into saturation. As the input voltage to amplifier 19 increases further, the combination network 30 receives, in addition to a constant signal voltage from limiter 20, only linear signal voltages from the remaining limiters 21–24, and hence delivers a changed linear voltage, as shown in FIG. 2 by line BC.

Above a certain value $V_2$ of the input voltage to amplifier 19, limiter 21 is also driven into saturation, so that the combination network 30 receives only linear signal voltages from voltage dividers 27, 28 and 29 apart from constant signal voltages supplied via voltage dividers 25 and 26. This again produces a changed linear output voltage of amplifier 19, as shown in FIG. 2 by line CD.

Similarly, with a certain voltage $V_3$ the amplifier 22 is driven into saturation, and in addition to the constant voltage contributions via voltage dividers 25, 26 and 27, the combination network receives only linear voltage components supplied via voltage dividers 28 and 29, as shown in FIG. 2 by line DE.

With a given value $\alpha$ of the desired amplitude transfer characteristic $y(t) = \{x(t)\}^\alpha$, the gradients and lengths of the lines AB, BC, CD and DE should be so chosen that these lines will approximate such a characteristic. The characteristic obtained in this way approximate the desired characteristic $y(t) = \{x(t)\}^\alpha$, where $0<\alpha<1$, shown by a dashed line in FIG. 2.

Finally, it should be noted that the compression amplifier of the invention can be used in a radar system designed for simultaneous suppression of noise and continuous-wave interference signals from a plurality of jamming sources, such as that set forth in the opening paragraph and described as the second embodiment in the above cited U.S. Pat. 3,202,990. In such a system, a compression amplifier having the amplitude transfer characteristic $y(t) = \{x(t)\}^\alpha$ can be inserted in each of the transmission channels.

What we claim is:

1. A radar system comprising a directional antenna, a transmitter coupled to said directional antenna, an omnidirectional antenna and a receiver to suppress interference signals during reception of target returns, said receiver including a first channel having an output and an input coupled to said directional antenna and a second channel having an output and an input coupled to said omnidirectional antenna, each of said channels including means for intermediate-frequency detection of signals composed of target returns and interference signals and a compression amplifier coupled to said detection means, said amplifier each having an amplitude transfer characteristic such that the signal $y(t)$ at said output of the respective channel approximates $y(t) = [x(t)]\alpha$, where $0<\alpha<1$ and $x(t)$ is the input signal to the respective compression amplifier, said receiver further comprising an interference canceller including a subtracting circuit having a pair of inputs and an output, means for coupling said output of said first channel to one of said inputs of said subtracting circuit, and a phase and amplitude compensating network coupled to said output of said second channel and said output of said subtraction circuit and having an output coupled to the other of said inputs of said subtraction circuit, said network generating at said output thereof a signal substantially equal in phase and amplitude to the signal coupled to said one input of said subtraction circuit when the signal at said output of said first channel is weaker than the signal at said output of said second channel.

2. A receiver for use in radar systems and the like, said receiver comprising a first and second channel each having an input and an output, each of said channels including means for intermediate-frequency detection of radio frequency-signals composed of target return and interference signals and a compression amplifier coupled to said detection means, said compression amplifiers each having an amplitude transfer characteristic approximating $y(t) = [x(t)]^\alpha$, where $0<\alpha<1$ and $x(t)$ and $y(t)$ are the input signals to the respective amplifier and the signal at the output of the associated channel, respectively, and an interference canceller for suppressing the interference signals during reception of said radio frequency signals, said interference canceller including a subtracting circuit having a pair of inputs and an output, means for coupling said output of said first channel to one of said inputs of said subtracting circuit, and a phase and amplitute compensating network coupled to said output said second channel and said output of said subtraction circuit and having an output coupled to the other of said inputs of said subtraction circuit, said network generating at said output thereof a signal substantially equal in phase and amplitude to the signal coupled to said one input of said subtraction circuit when said signal at the output of said first channel is weaker than the signal at said output of said second channel.

3. A receiver according to claim 2, wherein said compression amplifiers each include a plurality of linear limiters connected in series, said series connected limiters being coupled to said detection means, and a combining network coupled to the output of each limiter for generating, when not driven into saturation, a signal proportional to the sum of the output signals of said limiters which approximates the signal $y(t)$ as said limiters are successively driven into saturation with increase of said input signal to the compression amplifier.

4. A receiver according to claim 2, wherein said coupling means includes an oscillator and a first mixer having a pair of inputs coupled to said oscillator and said output of said first channel, respectively, and an output coupled to said one input of said subtraction circuit, and wherein said phase and amplitude network, includes a narrow band crystal filter whose central frequency is substantially equal to the frequency of said oscillator and having an input and an output, a second mixer connected to said output of said subtraction circuit and said output of said second channel and having an output connected to said input of said filter and a third mixer connected to said output of said filter and said output of said second channel and having an output coupled to said other input of said subtraction circuit.

* * * * *

UNITED STATES PATENT AND TRADEMARK OFFICE
CERTIFICATE OF CORRECTION

PATENT NO. : 4,119,963
DATED : October 10, 1978
INVENTOR(S) : JOHAN MARTIN CAROL ZWARTS ET AL It is certified that error appears in the above-identified patent and that said Letters Patent are hereby corrected as shown below:

Claim 1, line 3, after "receiver" insert --adapted to--

Signed and Sealed this

Twenty-fourth Day of April 1979

[SEAL]

Attest:

RUTH C. MASON
Attesting Officer

DONALD W. BANNER
Commissioner of Patents and Trademarks